Patented Aug. 14, 1951

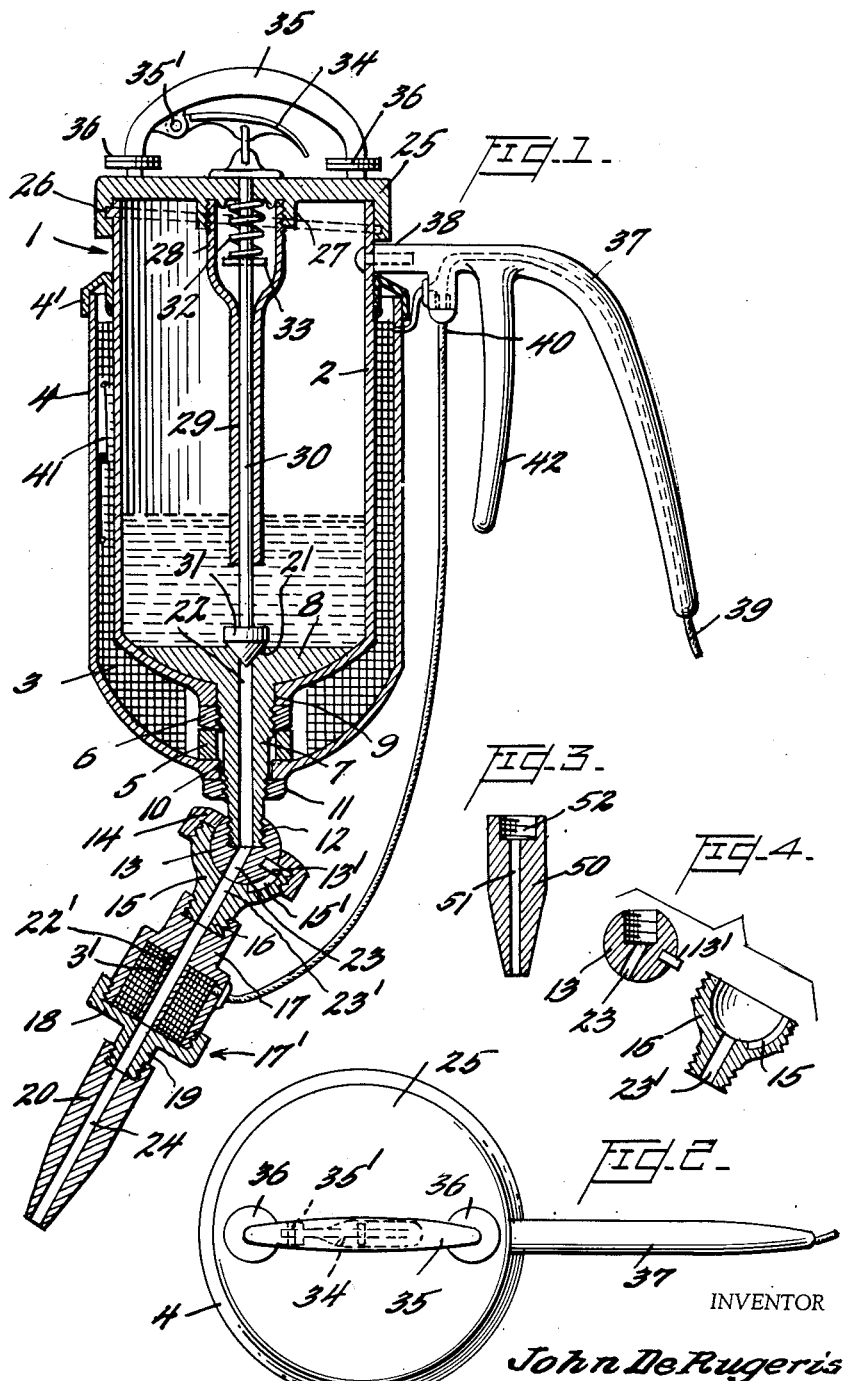

2,564,427

UNITED STATES PATENT OFFICE 2,564,427

ELECTRICALLY HEATED SOLDERING POT

John De Rugeris, San Jose, Calif.

Application April 3, 1950, Serial No. 153,546

1 Claim. (Cl. 219—27)

My invention relates to new and useful improvements in electrically heated soldering pots, and has for an object to provide a pot that will hold a relatively large amount of solder so that the same may be accurately poured from the same rather than using a ladle as is now the conventional method.

Still another object of the invention is to provide a soldering pot having a nozzle on which may be fastened a soldering tip when only a small amount of solder is to be used, the tip to take the place of the ordinary soldering iron.

Still another object of the invention is to provide a soldering pot having a valve for releasing the solder into the nozzle and to so form the nozzle that the flow of solder from the nozzle may be cut off without operating the aforementioned valve.

Still another object of the invention is to provide a soldering pot having an electrical heating unit surrounding the pot and a supplemental heating unit down in the flexible nozzle, so that the solder will not cool while flowing from the pot through the nozzle to the tip. Also, the supplemental heating unit is used for heating the tip.

Still another object of the invention is to provide an electrically heated soldering pot that may be used either to pour the solder; or wherein the substituted tip may also be used as a soldering iron, thus doing away with the ordinary ladle in some cases, and doing away with a soldering iron in other cases.

With these and other objects in view, the invention consists in certain new and novel arrangements and combinations of parts as will be hereinafter more fully described and pointed out in the claim.

Referring now to the drawings, showing a preferred embodiment,

Fig. 1 is a vertical, sectional view of the improved soldering pot, showing the main valve closed and the exit from the nozzle being in registry with the exit from the pot, Fig. 2 is a top plan view, the dotted lines showing the handle for the main valve, Fig. 3 is a detailed sectional view, showing a substitute soldering tip, and Fig. 4 is a detailed sectional view, showing the ball and socket assembly.

Referring now more particularly to the several views and to Fig. 1 for the moment, there is shown the pot 1, which consists of the main metal casing 2, and about the greater portion there is the electric heating unit 3 (shown diagrammatically). About this unit 3 there may be seen an outer larger casing 4, or shell, which follows in contour that of the inner casing 2. The upper edge of this casing 4 fits under a collar 4' in the form of a shield, which collar 4' is fitted about the casing 2. This collar 4' will thereby shield or prevent any solder or dirt from getting between the inner casing 2 and the outer casing 4.

To properly space this outer casing 4 from the casing 2, there may be seen at the bottom of the pot the collar or spacer 5; and above the same may be seen a nut 6 that is threaded about a stem 7 that projects downwardly from an inner, removable base 8, mounted in the bottom of the casing 2 of the pot 1.

It will be understood that the casing 2 has the central opening 9 through which this stem 7 projects; and likewise there is a central opening 10 in the bottom of the outer casing 4 through which the stem 7 also projects.

There also may be seen the bottom nut 11 threaded about the stem 7, so that (sic) the stem 7 and its base 8 are held in position; and also the outer casing 4 is spaced and held tightly relative to the inner casing 2.

The bottom end of the stem 7 is threaded as at 12 and fits within the ball 13, and over the upper portion of the ball 13 is a plate 14, having an opening smaller than the diameter of the ball 13, said plate 14 being threaded on the upper end of a socket member 15. The socket 15 also has the stem 16 about which is threaded a casing 17 and on the outer end of this casing 17 is threaded the bottom plate 18 with its threaded stem 19. On this stem 19 is shown the tip 20, which in this instance is relatively long and thin, as through this stem 19 the solder is to be poured, rather than using this tip 20, as a soldering iron.

As will be mentioned later, this casing 17 encloses a supplemental heating unit 3'.

By having the ball 13 and socket 15 joint, heating chamber 17, and tip 20, there is provided a flexible heated nozzle 17' that also functions as a cutoff valve.

On the ball 13 there may be seen the projecting pin 13' which is diametrically opposite the passageway 23 (to be mentioned later) in the ball 13; and this pin 13' rides in the groove 15' in the socket member 15 so that rather than having a universal movement, the flexible nozzle 17' will always be guided in its movement to bring the passageway 23' in to or out of alignment with the passageway 23 (both passageways to be next mentioned).

The base 8 has a valve seat 21 in its upper surface, which is about the walls of the orifice 22 leading through the base 8 and stem 7; and this passageway or orifice 22 normally registers with a passageway 23 extending through the ball 13 and passageway 23' in the socket 15 connection, and through a central collar 22' in the casing 17, and registers in turn with the orifice 24 running through the tip 20. In other words, when the rotatable, adjustable nozzle 17' is in the position shown in Fig. 1, the molten solder may flow from the pot 1 through the nozzle 17', be heated as it passes out through the same, and will then flow out through the tip 20.

Now, referring to the main operating valve and its parts, there will be seen the lid 25 which may be threaded as at 26 to the casing 2, it being understood that these might be partial threads rather than complete circumferential threads; and centrally on the under-surface of the lid 25 is a small hollow threaded boss 27 in which is threaded the upper enlarged end 28 of the tube 29, through which passes the main valve stem 30; while on the lower end of which stem 30 is the head or gate 31 that operates on the aforementioned seat 21.

Fitting within the enlarged end 28 may be seen a spring 32 about the upper end of the stem 30 and impinging on a cross-pin 33 in the stem 30 and against the top of the lid 25 to normally hold the valve stem 30 and gate 31 in their lowermost or closed position. On the top of the stem 30 and above the lid 25 may be seen the non-heat-conducting trigger 34 which appears directly under a small strap handle 35 on the upper surface of the lid 25. This trigger 34 is pivoted to the handle 35 as at 35'.

It will be seen that the tube 29 acts as a guide or bearing for the valve stem 30. The strap handle 35 may have small cooling plates 36 thereon and air gaps for cooling purposes; and the guide or tube 29 also tends to keep the valve stem 30 from getting too hot to manipulate through the trigger 34.

Still glancing at Fig. 1, there may be seen the handle 37 which is fastened at 38 to the casing 2, while the lead-in wires 39 may pass in through this handle 37 and connect at one point to the heating element 3 and then may also have a connection, as shown at 40, down to the heating element 3' within the casing 17.

Also, there may be seen the small thermostat 41 in the heating unit 3. There also may be a hand guard 42 projecting from the main handle 37, so that the hand of the operator can not come in contact with the outer shell 4.

To operate the pot 1, as shown in Fig. 1, after the lid 25 has been removed, the solder placed in the pot 1, and the lid 25 returned, the current will be turned on to melt the solder, as shown in dotted lines at 43, and any solder within the flexible nozzle 17'. Then, on a raising of the trigger 34, the solder may pass under the valve head 21 out through the passageway 22 in the stem 7, and through the passageway 23 in the ball 13 and the passageway 23' in the socket 15, and out of the passageway 24 in the tip 20. In other words, the solder will flow as long as the valve stem 30 is held in a raised position and the openings in the flexible nozzle 17' are in a registering position with the opening 23 in the ball 13.

To cut off the supply of solder, the upper trigger 34 may be released so that the valve stem 30 and its gate 31 will lower and then the flexible nozzle 17' may be swung from the position as shown, so that the exit through the stem 7 and through the flexible nozzle 17' are not in alignment. Thus, any solder that is above the ball and socket connection 13 and 15 will be cut off.

Furthermore, by having a flexible or articulated or pivotal nozzle 17' arranged to cut off the supply of solder, it will be seen that the lid 25 can be removed at any time to put in more solder; and the flow will be cut off by simply moving the flexible nozzle 17'.

It will also be seen that by putting a heating element 3' in the chamber 17 the solder, although it may have cooled slightly from its exit from the pot 1 to the tip 20, will again be heated before it flows through to the tip 20, thus keeping the solder in its molten condition, even though the pot 1 might be used where the outside temperature is low.

In Fig. 3, I have shown a soldering tip 50 which has its central passageway 51 and is threaded in its upper end as at 52 to fit on the aforementioned threaded stem 19, of the heating chamber 17. This tip 50 may be shorter than the tip 20 and contain more metal; and will be heated also from its close proximity to the supplemental heating unit 3'. This tip 50 often can be used in place of a conventional soldering iron.

From the foregoing, it will be seen that I have provided an electrically heated soldering pot that may be used where relatively large amounts of solder are necessary, and thus dispenses with the ordinary ladle. Furthermore, a soldering tip may be substituted so that in many instances the conventional soldering iron can be dispensed with; and, third, by having practically two valves in the pot, the lid with its valve may be removed and still not let the solder flow through the flexible, articulated nozzle.

It will be understood that the pot will be efficient when lead is to be used, or tar, or any similar substance that is to be melted to a fluid condition.

Many slight changes might be made without departing from the spirit and scope of the invention.

Having thus described my invention, what I claim is new and desire to secure by Letters Patent is:

In an electrically heated soldering pot, an inner casing or pot, an outer shell encircling said inner pot and spaced therefrom, an electric heating unit in said space, the casing and shell having registering central openings in their bottom; a removable base having a stem extending through said openings, said base and stem having a passageway therethrough; means for holding the spaced shell, base and inner casing in fixed relationship with one another; a pivotal hollow nozzle secured to said stem and acting as a valve to cut off or permit the flow of solder through said nozzle, depending upon the pivotal position of said nozzle with relation to the passageway in said stem; a hollow soldering tip secured to the end of said nozzle; a removable lid, a tube having an enlarged upper end securely mounted in the under-surface of said lid; a valve having a stem mounted in said tube and extending through said lid, a trigger on top of said stem, spring means for normally holding the valve stem and valve in their lowermost position, the said valve cooperating with a valve seat formed at the top of the passageway in the stem, said valve permitting the flow of solder through said stem when said valve is raised; a second electrical heating unit incorporated in said nozzle; an insulating handle for said pot, feed wires passing through said handle and connected to said heating units, and a hand guard extending downwardly from said handle.

JOHN DE RUGERIS.

REFERENCES CITED

The following references are of record in the file of this patent:

UNITED STATES PATENTS

| Number | Name | Date |
|---|---|---|
| 283,287 | Schoening | Aug. 14, 1883 |
| 1,754,382 | Baracate | Apr. 15, 1930 |
| 2,206,173 | Ewing | July 2, 1940 |